United States Patent
Turcotte et al.

(10) Patent No.: US 6,676,847 B2
(45) Date of Patent: *Jan. 13, 2004

(54) MONOCARBOXYLIC ACID BASED ANTIFREEZE COMPOSITION FOR DIESEL ENGINES

(75) Inventors: David E. Turcotte, Lexington, KY (US); Michael A. Dituro, Huntington, WV (US); Arnold L. Coffey, Jr., Lexington, KY (US); Alden W. Olsen, Lexington, KY (US); Carl R. Stephens, Ashland, KY (US)

(73) Assignee: Ashland Inc., Lexington, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/851,368

(22) Filed: May 8, 2001

(65) Prior Publication Data

US 2002/0030177 A1 Mar. 14, 2002

Related U.S. Application Data

(63) Continuation-in-part of application No. 09/513,323, filed on Feb. 25, 2000, now Pat. No. 6,290,870.
(51) Int. Cl.$^7$ .................................................. C09K 7/50
(52) U.S. Cl. ............................ 252/76; 252/73; 252/74; 252/75; 252/77; 252/79
(58) Field of Search ............................ 252/73, 75, 76, 252/77, 79, 74

(56) References Cited

U.S. PATENT DOCUMENTS

| | | | | | |
|---|---|---|---|---|---|
| 4,647,392 | A | * | 3/1987 | Darden et al. | 252/75 |
| 5,269,956 | A | * | 12/1993 | Miller et al. | 252/67 |
| 5,741,433 | A | * | 4/1998 | Mitchell et al. | 252/74 |
| 6,010,639 | A | * | 1/2000 | Mitchell | 252/76 |

* cited by examiner

*Primary Examiner*—Necholus Ogden
(74) *Attorney, Agent, or Firm*—Carrithers Law Office; David W. Carrithers

(57) ABSTRACT

The present invention relates to a carboxylic acid based antifreeze coolant formulation for heavy duty applications such as for diesel engines which may be used for inhibition and prevention erosion and corrosion of aluminum and the corrosion of other metals exposed to an aqueous liquid in automotive coolant systems. The formulation further inhibits mineral scale. It may be packaged as an ethylene glycol based additive for use in new engines or in a concentrated inhibition package as an additive as for reinhibition of used coolant. The combination of a mixture of ethylene or propylene glycol, a monobasic carboxylic organic acid, azoles, low levels of molybdates, a nitrite salt and/or nitrate salt and/or siloxane stabilized silicate, and combinations thereof, polyvinylpyrrolidone, provide a synergistic protective effect against the cavitation corrosion of aluminum in aqueous liquids reducing the corrosion rate and is effective at relatively low concentrations and varying pH ranges.

43 Claims, No Drawings

MONOCARBOXYLIC ACID BASED ANTIFREEZE COMPOSITION FOR DIESEL ENGINES

This application is a Continuation-In-Part of U.S. patent application Ser. No. 09/513,323 filed on Feb. 25, 2000 U.S. Pat. No. 6,290,870; claiming priority from U.S. patent application Ser. No. 09/510,880 filed on Feb. 23, 2000 which is to issue on May 22, 2001 as U.S. Pat. No. 6,235,217; which claims priority from U.S. patent application Ser. No. 09/135,138 filed on Aug. 17, 1998 which has issued as U.S. Pat. No. 6,126,852 on Oct. 3, 2000; all of which are hereby incorporated by reference.

TECHNICAL FIELD

This invention relates to an acid based antifreeze coolant formulation for heavy duty applications such as for diesel engines which may be used for inhibition and prevention erosion and corrosion of aluminum and the corrosion of other metals exposed to an aqueous liquid in automotive coolant systems. The formulation further inhibits mineral scale. It may be packaged as an ethylene glycol based additive or in a concentrated corrosion inhibition package for use in new engines or as an additive as for reinhibition of used coolant.

DESCRIPTION OF THE PRIOR ART

Automotive engine cooling systems consist of many metals including aluminum, steel, cast iron, brass, copper and solder. Engine coolants must not only provide freeze protection but corrosion inhibition as well. Often the components are thin walled for improved heat transfer making them more vulnerable to corrosive attack and subsequent failure. Corrosion products and deposits can interfere with heat transfer. Ultimately overheating and engine failure from thermal related stresses are possible.

Antifreeze/coolant technology traditionally uses silicate as a corrosion inhibitor. Silicates are particularly useful in protecting aluminum automotive cooling system components.

Traditionally antifreeze/coolant is sold at nearly one-hundred percent glycol content. This concentrated packaging allows for flexibility so that the user can dilute the antifreeze/coolant, as needed, with available water to obtain the required freeze/boil protection. However, corrosion protection is needed over the entire dilution range. Moreover, the present invention may be formulated as an additive concentrate package for direct application to existing used diluted antifreeze/coolant mixtures in engines to stabilize and replace components of the coolant.

In modern automotive engineering, many engine components are fabricated from aluminum. Engine coolants, primarily ethylene glycol or propylene glycol based solutions, must transfer heat from operating aluminum engines while inhibiting corrosion. Older automotive engines did not have aluminum components and thus, the traditional antifreeze/coolant compositions may produce corrosion in heat rejecting aluminum or aluminum alloy components. The cavitation erosion-corrosion of aluminum water pumps upon exposure to aqueous systems such as water-cooled internal combustion engine coolants is a relatively new development.

U.S. Pat. No. 4,717,495 by Hercamp et al., hereby incorporated by reference, teaches a sodium-free buffer solution. U.S. Pat. No. 4,548,787 discloses the use of a combination water soluble phosphate with tungstate, selenate and molybdate for protection against cavitation erosion-corrosion on aluminum. U.S. Pat. No. 4,404,113 discloses the use of polyhydric alcohols as corrosion inhibiting and cavitation reducing additives for coolants.

U.S. Pat. No. 4,440,721, discloses the combination of a water-soluble phosphate with a water soluble molybdate, tungstate, or selenate for providing a protective effect against the cavitation corrosion of aluminum in aqueous liquids.

Engine coolants based on inorganic components like silicates, phosphates, nitrates, borates and nitrites have problems due to inhibitor depletion. The depletion to these components, particularly the silicates have lead to concerns about lifetime. More over, high solids loading from inorganic salts presents potential deposit issues. The precipitating solids may scale and plug passages within the engine coolant system.

Recently the automotive industry has developed engine coolants based primarily on carboxylic acid technology. Many U.S. and foreign patent references disclose the use of various monobasic or dibasic acids or salts as corrosion inhibitors. For example, in U.S. Pat. No. 4,647,392, Darden teaches a synergistic combination of 0.1 to 15 weight percent of $C_5$ to $C_6$ aliphatic monobasic acid with the same amount of $C_5$ to $C_6$ dicarboxylic acid and 0.1 to 0.5 weight percent of a hydro carbonyl triazole. The triazole is typically tolytriazole or benzotriazole. The acids are present as salts in an alkaline solution. In U.S. Pat. No. 4,946,616, Falla teaches a mixture of two aliphatic dicarboxylic acids with a hydrocarbyl triazole. In U.S. Pat. No. 4,587,028, Darden discloses two to five weight percent of an aromatic monocarboxylic acid, benzoic acid, with 0.5 to 1.5 weight percent of a $C_8$ to $C_{12}$ aliphatic carboxylic acid and an alkali metal nitrate. British military specification TS 10177 (Al39), March of 1978, call for 4 to 4.5 weight percent of sebacic acid(aliphatic dicarboxylate) and 0.25 to 0.30 weight percent of benzoytriazole. In U.S. Pat. No. 4,382,008, Boreland has combined an aromatic monocarboxylic acid with C7 to C13 dibasic organic acids and conventional inhibitors such as borate and silicate to prepare formulations. However, the use of these additives increase the overall cost of the formulation.

U.S. Pat. No. 5,366,651 by Maes et al. emphasizes that imidazole serves as a buffer to assist in pH control and serve as the buffer in carboxylic acid based antifreeze formulations. Imidazole is an unsubstituted triazole containing two nitrogen molecules providing a very active triazole molecule to combine with hydrogen providing a neutralizing or buffering capability.

In summary, a wide number of organic acids have been successfully used in various combinations among themselves and with more common components. Typically acids are used at the several percent level if common inhibitors are not present. The presence of hydrocarbyl triazoles indicates that yellow metals such as copper and brass, and solder must be protected separately. The carboxylates are primarily inhibiting ferrous metals and aluminum in these formulations. Despite the successful lab data reported, questions remain about the ability of full acid technologies like Darden and Falla to protect solder and prevent cavitation erosion-corrosion on aluminum in engine applications. Further, the addition of large quantities of inorganic salts to correct these deficiencies negates the low solids benefit.

None of the above references provide a means for obtaining a long life silicate acid-based antifreeze composition as does Applicant's present invention. Alkali metal molybdates and the soluble salts of tungstic and selenic acids have been used in antifreeze compositions to prevent the corrosion of metals, particularly cast iron, and soluble salts of molybdic, tungstic and selenic acids act to retard the corrosion of aluminum, particularly the cavitation erosion-corrosion of aluminum water pumps. The instant invention combines selected organic acids, azoles, nitrate and/or nitrite salts, molybdates, stabilized silicates and transition metal compounds provide a synergistic protective effect against the cavitation corrosion of aluminum in aqueous liquids reducing the corrosion rate and is effective at relatively low concentrations and varying pH ranges. The addition of selected organic acids not only significantly reduces glycol based coolant cavitation erosion-corrosion, heat rejecting aluminum corrosion, and hard water precipitates and scale, it has been discovered that utilization of selected organic acids in combination with certain additives enhance secondary silicate stabilization leading to improvement in aluminum corrosion protection and coolant life.

Moreover, the organic acids conventionally used with antifreeze coolants are based on dicarboxylic acids or combinations thereof. The present invention provides a means to utilize the less expensive monocarboxylic acids to obtain superior corrosion protection to the dicarboxylic acids either alone or in combination with other organic acid additives.

SUMMARY OF THE INVENTION

The present invention has met the above-described need by providing an antifreeze/coolant composition using selected additives which reduce corrosion over the entire dilution range without creating precipitates. This composition is soluble in water, alcohol, and alcohol/water mixtures, is compatible with other commonly used antifreeze/coolant components, does not corrode or damage automotive cooling systems and is effective at relatively low concentrations. In addition, the present corrosion inhibition formulations are effective in reducing corrosion in the entire range of cooling system metals, including heat rejecting aluminum, aluminum alloys, copper, steel, cast iron, brass, solder and the like.

The novel antifreeze formulation of the instant invention comprises a mixture of ethylene or propylene glycol, an organic acid, preferably a monobasic aliphatic organic acid, azoles, low levels of molybdates, nitrite and/or nitrate salts, polyvinylpyrrolidone, a hydroxide salt, silicates and/or siloxane stabilized silicates with transition metal compounds which provide a synergistic protective effect against the cavitation corrosion of aluminum in aqueous liquids reducing the corrosion rate and is effective at relatively low concentrations and varying pH ranges. The addition of selected organic acids not only significantly reduces glycol based coolant cavitation erosion-corrosion, heat rejecting aluminum corrosion, and hard water precipitates and scale, it has been discovered that the aliphatic monobasic organic acid in combination with siloxane stabilized silicates enhance secondary silicate stabilization leading to improvement in aluminum corrosion protection and coolant life when utilized with selected amounts of the above-identified additives. The formulations are particularly suitable for diesel engine applications.

More particularly, the present heavy duty formula for diesel engines has met the above-described need by providing supplemental additives such as nitrate and nitrite salts, silicates and/or siloxane stabilized silicates, and a polyvinylpyrrolidone at 15%, to a light duty formula for automotive use utilizing an ethylene based glycol antifreeze/coolant composition using a combination of a selected monocarboxylic acid, preferably an aliphatic carboxylic acid such as 2-ethylhexanoic acid, a hydroxide such as potassium hydroxide at 45%, a hydrocarbyl tolytriazole such as sodium tolytriazole at 50%, low levels of molybdate additives such as a sodium molybdate dihydrate, and optionally defoamers which reduce corrosion over the entire dilution range without creating precipitates.

The instant antifreeze formulation having a mixture of ethylene or propylene glycol, monobasic organic acid, azoles, and low levels of molybdates may also provide a synergistic protective effect against the cavitation corrosion of aluminum in aqueous liquids reducing the corrosion rate which is effective at relatively low concentrations and varying pH ranges. The combination of monobasic organic acid, hydrocarbyl tolytriazole, and low levels of molybdates not only significantly reduces glycol based coolant cavitation erosion-corrosion, heat rejecting aluminum corrosion, and hard water precipitates and scale, it has been discovered that the combination leads to improvement in aluminum corrosion protection and coolant life when utilized with selected amounts of the above-identified additives. Thus, the formulation is particularly suitable for automotive gasoline and diesel engine coolant applications.

A preferred embodiment of the present invention provides for an antifreeze/coolant solution for inhibiting the corrosion of metals and inhibiting mineral scale based on 100 parts by weight of said glycol-based solution comprising an effective amount which is usually from about 0.1 to about 10.0 weight percent of a monobasic carboxylic acid compound; an effective amount of a salt which is at least one selected from the group comprising sodium nitrate, potassium nitrate, magnesium nitrate, calcium nitrate, lithium nitrate and combinations thereof in an amount up to about 10.0 percent by weight and more particularly from about 0.01 to 10.0 percent by weight; and/or an effective amount of a salt which is at least one selected from the group comprising sodium nitrite, potassium nitrite, magnesium nitrite, calcium nitrite, lithium nitrite and combinations thereof in an amount of up to about 10.0 percent by weight, and preferably from about 0.01 to 10.0 percent by weight; an effective amount which is usually from about 0.01 to about 5.0 weight percent of an azole compound selected from the group comprising a sodium mercaptobenzothiazole, sodium tolytriazole, water-soluble triazoles, benzotriazole, tolyltriazole, or an effective amount of an azole compound having at least three nitrogen molecules which is usually an amount of from about 0.01 to about 10.0 percent by weight; an effective amount of a silicone, silicate, and/or silicone-silicate siloxane copolymer which is usually an amount of about 0.01 to about 10.0 percent by weight; an effective amount which is usually from about 0.001 to about 5.0 percent by weight of a polyvinylpyrrolidone; an effective amount which is usually from about 0.001 to about 10.0 weight percent of a transition metal compound selected from the group comprising disodium salt dihydrate of molybdic acid, molybdenum trioxide, silicoheteropolymolybdates and/or phosphoroheteropolymolybdates, sodium molybdate, potassium molybdate, lithium molybdate, ammonium molybdate, ammonium dimolybdate, and ammonium heptamolybdate; and an effective amount of a glycol compound selected from the group comprising ethylene glycol, diethylene glycol, propylene glycol, methyl alcohol, ethyl alcohol, propyl alcohol, isopropyl alcohol and combinations thereof making up the balance of the solution.

It is an object of the present invention to provide corrosion inhibition formulations for antifreeze/coolant compositions with selected monobasic carboxylic acid additives for reducing glycol based coolant cavitation erosion-corrosion.

It is another object of the present invention to provide corrosion inhibition formulations for antifreeze/coolant compositions with selected monobasic carboxylic acid additives for enhancing silicate stability providing an improvement in coolant life.

It is another object of the present invention to provide corrosion inhibition formulations which reduce corrosion over the entire dilution range of antifreeze/coolant compositions without creating precipitates.

It is an additional object of the present invention to provide corrosion inhibition formulations which are effective in reducing corrosion in the entire range of cooling system metals.

It is an additional object of the present invention to provide corrosion inhibition formulations which are effective in reducing heat rejecting aluminum corrosion.

It is an additional object of the present invention to provide corrosion inhibition formulations which are effective in reducing hard water precipitates and scale.

It is a further object of the present invention to provide corrosion inhibition formulations which are soluble in alcohol, alcohol/water mixtures and water alone.

It is an object of the present invention to provide corrosion inhibition formulations which are compatible with commonly used antifreeze/coolant components.

It is another object of the present invention to provide corrosion inhibition formulations which are effective at relatively low concentrations.

It is an additional object of the present invention to use organic acids in the corrosion inhibition formulations to reduce the corrosion.

It is a further object of the present invention to utilize at least one nitrite, at least one nitrate, or a combination of nitrites and nitrates to maximize the protection of ferrous metals and minimize pitting thereof.

It is a further object of the present invention to utilize molybdate to protect against erosion and cavitation of aluminum.

It is a further object of the present invention to provide corrosion inhibition formulations for antifreeze/coolant compositions utilizing an acid based formula in combination with a stabilized silicate for enhancing coolant stability providing an improvement in coolant life for heavy duty coolant applications in diesel engines.

It is an additional object of the present invention to utilize a monobasic carboxylic acid and a hydrocarbyl triazole to allow a low level of molybdate to be utilized in the corrosion inhibition formulations to reduce the corrosion.

These and other objects of the present invention will be more fully understood from the following description of the invention.

DESCRIPTION OF THE PREFERRED EMBODIMENT

The present invention provides long life corrosion inhibition antifreeze/coolant compositions by using certain carboxylic acid derivatives preferably monocarboxylic acids with a stabilized silicate siloxane, silicate, or siloxane compound, and other selected compounds, primarily the combination of nitrates and nitrates and an increased amount of molybdate which reduces coolant cavitation erosion-corrosion, heat rejecting aluminum corrosion, and hard water precipitates and scale, and enhance secondary silicate stabilization leading to improvement in aluminum corrosion protection and prolonged coolant life as compared to conventional silicon based coolants.

Moreover, selected organic acids, preferably monobasic aliphatic organic acids used with low levels of molybdate and a hydrocarbyl triazole in glycol mixtures produce a well balanced antifreeze corrosion inhibiting formulation with very low solids to minimize potential deposits and surprising long life characteristics in engine testing.

Thus, present invention combines the components of the organic acid with the stabilized silicate composition. The novel antifreeze formulation of the instant invention comprises a mixture of ethylene or propylene glycol, an organic acid, preferably a monobasic aliphatic organic acid, azoles, low levels of molybdates, nitrite and/or nitrate salts, a polyvinylpyrrolidone, a hydroxide salt, silicates and/or siloxane stabilized silicates with transition metal compounds. The addition of nitrate and nitrite salts, silicates and/or siloxane stabilized silicates, and a polyvinylpyrrolidone to a light duty organic acid antifreeze formula for automotive use provides for a heavy duty coolant suitable for diesel engines. Moreover, the present composition comprises an antifreeze/coolant composition using a combination of a linear aliphatic carboxylic acid such as 2-ethylhexanoic acid, a hydroxide such as potassium hydroxide at 45%, a hydrocarbyl tolytriazole such as sodium tolytriazole at 50%, low levels of molybdate additives such as a sodium molybdate dihydrate, and optionally defoamers which reduce corrosion over the entire dilution range without creating precipitates.

A preferred embodiment of the present invention provides for an antifreeze/coolant solution for inhibiting the corrosion of metals and inhibiting mineral scale based on 100 parts by weight of said glycol-based solution comprising a monobasic carboxylic acid comprising from about 0.1 to about 10.0 weight percent of a linear aliphatic monobasic carboxylic acid compound; a salt which is at least one selected from the group consisting essentially of sodium nitrate, potassium nitrate, magnesium nitrate, calcium nitrate, lithium nitrate and combinations thereof in an amount of about 0 to about 10.0 percent by weight; a salt which is at least one selected from the group consisting essentially of sodium nitrite, potassium nitrite, magnesium nitrite, calcium nitrite, lithium nitrite and combinations thereof in an amount of about 0.001 to about 10.0 percent by weight; from about 0.01 to about 5.0 weight percent of an azole compound selected from the group consisting essentially of sodium mercaptobenzothiazole, sodium tolytriazole, water-soluble triazoles, benzotriazole, and tolyltriazole, in an amount of about 0.0 to about 10.0 percent by weight; a silicone-silicate copolymer in an amount of about 0.01 to about 10.0 percent by weight; from about 0.001 to about 5.0 percent by weight of a polyvinylpyrrolidone; from about 0.001 to about 10.0 weight percent of a transition metal compound selected from the group consisting essentially of disodium salt dihydrate of molybdic acid, molybdenum trioxide, silicoheteropolymolybdates and/or phosphorohetero-polymolybdates, sodium molybdate, potassium molybdate, lithium molybdate, ammonium molybdate, ammonium dimolybdate, and ammonium heptamolybdate; and a glycol compound selected from the group consisting essentially of ethylene glycol, diethylene glycol, propylene glycol, methyl alcohol, ethyl alcohol, propyl alcohol, isopropyl alcohol and combinations thereof making up the balance of the solution.

The formulation according to the instant invention lead to improvement in aluminum corrosion protection and prolonged coolant life as compared to conventional silicon based coolants. In addition, the present corrosion inhibition formulations are effective in reducing corrosion in the entire range of cooling system metals, including heat rejecting aluminum, aluminum alloys, copper, steel, cast iron, brass, solder and the like. This formulation is soluble in alcohol, alcohol/water mixtures and in water alone and exhibits excellent stability characteristics.

The most preferred antifreeze/coolant composition has a pH of about 8.5 to 9.0 and having about 94% antifreeze grade glycols and about 3% corrosion inhibitors, with the balance being water. The most preferred reinhibition concentrate would be added at a rate of one (1) part to approximately fifty (50) parts of spent diluted, coolant.

The freezing point depressant utilized in the antifreeze compositions of the invention can be any suitable water-soluble liquid alcohol used heretofore in formulating antifreeze compositions. The water-soluble alcohol contains 1 to about 4 carbon atoms and 1 to about 3 hydroxy groups. Ethylene glycol is preferred as the freezing point depressant and especially the commercially available mixtures containing largely ethylene glycol and a small amount of diethylene glycol. The commercial mixture generally contains at least 85 to 95 percent by weight of ethylene glycol with the remainder being diethylene glycol and small amounts of substances which are incidentally present such as water. Other water-soluble liquid alcohol can be admixed with ethylene glycol but such mixtures usually are not preferred. Inexpensive commercially available water soluble alcohols can also be used such as methyl, ethyl, propyl, and isopropyl alcohol alone or in mixtures.

The concentrated corrosion inhibitor formulations of the present invention is a water-based mixture of organic acids, nitrate and nitrite salts, molybdates, azoles, stabilized silicates and transition metal compounds. Optionally, other components including defoamers, dyes, buffering agents, biocides, detergents, and the like may be added to the present formulation. Alkaline earth or ammonium slats are also possible additives alone or in combination therewith. Nitrates and nitrites are typically introduced as an alkali salt although acid, alkaline earth or ammonium salts could be utilized including potassium, sodium or salts alone or in combinations therewith. The azoles include tolytriazole, benzotriazole, mercaptobenzothizole including mixtures and other substituted azoles. Stabilized silicate, typically referred to as siloxane compounds, are of the type described in U.S. Pat. Nos. 4,354,002, 4,362,644, and/or 4,370,255, hereby incorporated by reference. Suitable defoamers include PLURONIC® L-61, PATCOTE® 415 and other surfactants including silicone types.

It is contemplated that in addition to silicate-phosphate type coolants, these additives are useful in silicate-borax, silicate phosphate and borax coolants, organic acid, and organic acid silicate hybrid type coolants, and the like. The corrosion inhibitor formulations are compatible with other commonly used antifreeze/coolant components and are effective at relatively low concentrations.

Each of the preferred ingredients of the synergistic antifreeze formulation, whether mandatory or optional, is discussed below:

MONOBASIC CARBOXYLIC ACIDS

The monobasic acid component of the above-identified antifreeze formulation may be any $C_3$–$C_{16}$ monobasic carboxylic acid or the alkali metal salt thereof; however, in order to maintain the desired solubility, the preferred embodiment of the instant invention utilizes a monobasic carboxylic acid components or the alkali metal salt there of in the range of from about $C_6$ to about $C_{12}$. Preferably, the monobasic carboxylic acids include one or more of the following acids or isomers: hexanoic, heptanoic, isoheptanoic, octanoic, 2-ethylhexanoic, nonanoic, decanoic, undecanoic, dodecanoic, neodecanoic, and/or combinations thereof. The preferred composition uses an aliphatic monocarboxylic acid, more particularly preferred is 2-ethylhexanoic as the aliphatic monobasic acids. It is contemplated that one or more of the monobasic carboxylic acids set forth heretofore can be used in combination instead or in combination with the 2-ethylhexanoic acid; however, use of the 2-ethylhexanoic acid provides excellent results even when used as the only monocarboxylic acid. Any alkali metal hydroxide or ammonium hydroxide may be used to form the monobasic salt; however, sodium and potassium are preferred, and the potassium salt is most preferred. The monobasic acid or alkali metal salt component of the present invention is present in a concentration of from about 0.1 to about 10.0 weight percent, more preferably from about 1.0 to about 6.0 weight percent, and most preferably from about 2.0 to about 4.0 weight percent, based upon the total weight of the concentrate composition (the weight percent calculated based upon the free acid).

MOLYBDATE ADDITIVES

The water-soluble molybdate which is preferred for use in the aqueous systems of the present invention can be any salt of molybdic acid which is readily soluble in water. These include both alkali metal and alkaline earth metal molybdates as well as ammonium molybdate, the term "alkali molybdate" being used in a broad sense so as to include alkali metal, alkaline earth metal and ammonium molybdates. Examples of useful molybdates are sodium molybdate potassium molybdate, lithium molybdate and ammonium molybdates including ammonium dimolybdate and ammonium heptamolybdate. Alkali molybdate compounds, sodium molybdate, sodium molybdate dihydrate, molybdenum trioxine, heteropolymolybdates, and potassium molybdate are preferred because of their availability and compatibility with the aqueous system as well as for economic reasons. Typically, concentrations of the molybdate ion are below about 0.5 parts by weight per 100 parts by weight of aqueous liquid can be employed, whereby concentrations of molybdate ion above this limit normally do not provide significant improvements in the inhibitive characteristics or the aqueous system and are undesirable for economic reasons; however, in the instant invention it is believed that the molybdenum aids in the attachment and formation of the protective film upon the surface of the metal requiring protection. Particularly under rapid corrosion conditions such as the cavitation erosion corrosion of aluminum.

Transition metal compounds suitable for use in the present invention include, disodium salt dehydrate of molybdic acid, sodium molybdate $2H_2O$, molybdenum trioxide, silicoheteropolymolybdates, phosphoroheteropolymolybdates, mixtures thereof and the like. Any compatible transition metal may be used, including for example, molybdate, cobalt, cerium, mixtures thereof and the like. In addition, any acid salt may be used including sodium, potassium, lithium, calcium, magnesium and the like. The most preferred transition metal compound is the disodium salt dihydrate of molybdic acid or sodium molybdate $2H_2O$, $(Na_2MoO_4*2H_2O)$.

Transition metal acids are used to inhibit corrosion in formulations of the present invention. The transition metal compound is preferably present in the formulation in an amount of about 0.001 to about 5.0 percent by weight, and more preferably in an amount of about 0.01 to about 1.0 percent by weight. The molybdate ion is employed in amounts so as to provide a concentration in the aqueous system of at least about 0.001 parts by weight per 100 parts by weight of aqueous liquid. Preferably about 0.005 to about 0.5 parts by weight per 100 parts by weight of molybdate based upon said aqueous liquid are employed.

The addition of a selected amount of molybdate to the present composition provides a means for obtaining an acid based antifreeze coolant composition at a decreased cost as compared to other aliphatic monobasic antifreeze formulations. Moreover, acid based antifreeze compositions are very aggressive with respect to lead solder whereby a selected amount of molybdenum as exhibited by the instant invention serves to minimize if not to eliminate the deficiency of acid based composition with respect to lead solder.

SALT CORROSION INHIBITORS (Nitrates and Nitrites)

Where the aqueous liquids contact other metals in addition to aluminum, including aluminum water pumps, metal salt corrosion inhibitors, preferably alkali metal salts known in the prior art can be usefully added to the aqueous liquids or the invention. Such known corrosion inhibitors include the water-soluble: nitrates, nitrites, silicates, carbonates, sodium silicate, sodium nitrate, potassium carbonate, ammonium silicate.

At least one nitrite, at least one nitrate, or a combination of nitrites and nitrates are used to maximize the protection of ferrous metals and minimize pitting thereof.

A nitrate in combination with a nitrite is used in one preferred composition in a higher concentration for heavy duty applications in diesel engines than typically used in gasoline engines. The source of the nitrate and nitrite ions can be any water-soluble nitrate or nitrite such as the alkali metal nitrates and nitrites. Nitrate salts suitable in the present invention include, sodium nitrate, potassium nitrate, magnesium nitrate, calcium nitrate, lithium nitrate, mixtures thereof and the like. Nitrite salts suitable in the present invention include, sodium nitrite, potassium nitrite, magnesium nitrite, calcium nitrite, lithium nitrite, mixtures thereof and the like. Any compatible salt may be used including sodium, potassium, lithium, magnesium, calcium and the like. The most preferred nitrate salt is sodium nitrate and the preferred nitrite is sodium nitrite.

Other equivalent methods of supplying nitrate may be used. For example, the pH of the total composition may be adjusted by addition of nitric acid ions. The reaction of nitrate acid and basic salts contained in the composition will result in liberation of free carboxylic acid and the formation of nitrate salts.

Nitrate salts serve to inhibit corrosion in the formulations of the present invention. The nitrate salt is preferably present in the formulation in an amount of from 0 to about 10.0 percent by weight, and more preferably in an amount of about 0.01 to about 1.0 percent by weight. At least a portion of the nitrate salts can become oxidized wherein $NO_2 + \frac{1}{2} O_2 \rightarrow NO_3$ due to the reactions with the ions occurring within the solution and from the corrosive materials being protected thereby.

Nitrite salts are especially good for preventing heavy duty cylinder linings from pitting. They are good oxidizers when used with ferrous metals. The nitrites have a lower oxidation state than the nitrates and are ions are depleted at a higher rate making them more expensive than the nitrate salts; however, the nitrite are especially good in reducing pitting. Of course, the nitrites form nitrates upon oxidation. The nitrite salt is preferably present in the formulation in an amount of about 0 to about 10.0 percent by weight, and more preferably in an amount of about 0.01 to about 1.0 percent by weight.

The preferred embodiment of the present formulation utilizes a greater amount of water soluble nitrite than water soluble nitrates. More specifically, one preferred formula utilizes water soluble nitrates in a range of from about 0.05 to about 0.30 percent by weight, and water soluble nitrites in a range of from about 0.30 to about 0.60 percent by weight, representing about a 2:1 ratio.

AZOLE ADDITIVES

Azoles are present in the formulation to inhibit corrosion of yellow metal like copper and brass. Brass thermostats and radiator caps are common as well as copper and brass radiators. The azole compound providing protection for copper and brass from corrosion is selected from among the water-soluble triazoles. Generally, the alkali metal salts are used. Specific preferred azole compounds include benzotriazole, tolyltriazole, and sodium 2-mercaptobenzothiazole. Azole compounds suitable in the present invention include salts of mercaptobenzothiazole, salts of tolytriazole, benzotriazole, mixtures thereof and the like. Typically, these azoles are preferably present in a fifty percent concentration. However, one preferred azole compound consists of the salts of benzothiazole and/or salts of tolytriazole. More particularly, one preferred azole compound is a mixture of benzothiazole and tolytriazole which may be used in about a 3 to 1 ratio by weight.

Some existing antifreeze formulations contain triazoles such as sodium 2-mercaptobenzimidazole and imidazole which define unsubstituted triazoles containing two nitrogen molecules providing a very active triazole molecule to combine with hydrogen providing a neutralizing or buffering capability when used with a carboxylic acid.

The hydrocarbyl triazole and other azole compounds utilized in Applicants' preferred embodiment contain azole compounds containing three nitrogen molecules and/or are more substituted and less active than the imidazole and therefor less corrosive to engine components and seals. Other than the imidazole, the selected less active and more stable azole compounds in the instant formulation are important as corrosion inhibitors for protecting yellow metal.

The azoles are preferably present in the formulation in an amount of about 0.01 to about 10.0 percent by weight, and more preferably in an amount of about 0.05 to about 1.0 percent by weight. Generally, the azole compound is used in amounts of about 0.1 parts to about 0.5 parts by weight, preferably about 0.1 to about 0.4 parts by weight, based on 100 parts by weight of the aqueous liquid.

SILICATE AND SILOXANE-SILICATE COPOLYMERS

Silicates and water soluble siloxane can be used alone or preferably in combination with stabilized silicates defined as phosphonate and sulfonate siloxane-silicate copolymers formed in situ upon combination of a water-soluble silicate and a water-soluble siloxane. In the preferred composition, the silicone-silicate copolymer is selected from the group comprising alkali siliconate silylalkylphosphonates and salts thereof, arylalkyl silicone sulfonate-silicates and salts thereof, and sulfosiloxane-silicates and salts thereof and/or mixtures thereof.

These copolymers are believed to provide improved metal corrosion inhibition over the use of the water-soluble silicates. The stabilized silicate, ("siloxane copolymers"), substantially inhibit the gelation tendency of a water-soluble silicate at a pH of about 7 to about 11. The anti-corrosive activity of the soluble silicate is maintained in the copolymer as compared to an ordinary unstabilized soluble silicate such as sodium silicate. The stabilized silicone/silicate technology is disclosed in U.S. Pat. Nos. 4,370,255; 4,362,644; and 4,354,002, all hereby incorporated by reference. Other siloxane-silicate copolymers can be utilized in combination with the water-soluble molybdates and the water-soluble salts and esters of phosphorus acids. These are disclosed in U.S. Pat. Nos. 3,341,469; 3,337,496; 3,312,622; 3,198,820; 3,203,969; 3,248,329; and 4,093,641 all incorporated herein by reference.

Although it is possible as shown in Tables 5–7 to utilize a nitrate and/or a nitrite salt in combination with a selected formula such as A2 set forth herebelow, the silicone/silicates are used to inhibit corrosion in the formulation of the present invention.

The silicone silicates are preferably present in the formulation in an amount of about 0.1 to about 10.0 percent by weight, and more preferably in an amount of about 0.2 to about 1.0 percent by weight.

POLYVINYLPYRROLIDONE

The preferred embodiment of the antifreeze composition utilizes polyvinylpyrrolidone, 15% $(C_6H_9NO)_n$ which is soluble in both water and organic solvents and present in the formulation in an amount of up to about 3.0 percent by weight, more preferably in an amount of from about 0.01 to about 1.0 percent by weight, and most preferably in an amount of between about 0.1 to 0.5 percent by weight.

pH CONTROLLING COMPOUNDS

The preferred embodiment of the antifreeze composition uses potassium hydroxide at 45 percent concentration in a range of from about 0.5 to 10.0 weight percent, more preferably in a range of from about 1.0 to 5.0 weight percent, and most preferably from about 2.5 to 3.0 weight percent to achieve the desired ph of about 6.0 to 12.0, and preferably from between about 8.0 to about 9.0. Other pH adjusting or controlling compounds may be added such as basic and/or acidic compounds, i.e. NaOH, KOH or $NH_4OH$, and mineral or organic acids, i.e., HCl, $H_2SO_4$, or acetic acid, or buffering agents such as borates, to maintain the pH in the range of about 8.5 to 9.0.

DEFOAMERS

Any suitable defoamer, well known in the art, is suitable for the present formulations. Suitable defoamers include, for example, PLURONIC® L-61 non-ionic surfactant (commercially available from BASF® Corporation) or PAT-COTE® 415 liquid defoamer (commercially available from PATCO Specialty Chemicals Division, American Ingredients Company). The defoamer may be present in an amount up to about 10.0 percent by weight and more preferably present in an amount of about 0.001 to about 10.0 percent by weight, and most preferably, in an amount of about 0.01 to about 0.05 percent by weight.

ADDITIVES

Other additives such as bittering agents, dyes, buffering agents, or biocides may be added to the antifreeze/coolant solution.

The above combination of a selected carboxylic acid and stabilized silicates ("siloxane"), in combination with inhibitors is particularly suited for the corrosion protection of aluminum in contact with an aqueous system so as to provide protection against cavitation-erosion corrosion or aluminum water pumps in a long life antifreeze composition providing additional protection as compared to other silicate and stabilized silicate based compositions without the addition of the aliphatic carboxylic acid. Other corrosion inhibitors are optionally added to the aqueous liquid exhibiting synergy together and in combination with the siloxane/organic acid components.

The combination of corrosion inhibitors useful in inhibiting the cavitation-erosion corrosion of aluminum water pumps is generally effective in a basic aqueous corrosive media. For instance, the corrosion inhibitors of the invention are useful in aqueous alcohol based antifreeze compositions which are generally maintained at a pH of at least 6, and preferably about 7 to about 11. The corrosion inhibitors of the invention are also useful in best transfer media utilized in cooling towers.

The antifreeze concentrates of the invention are prepared by first dissolving in a water-alcohol blend (preferably ethylene glycol in combination with diethylene glycol) an aliphatic monobasic carboxylic acid and a water-soluble silicate, an organosiloxane, preferably a phosphonate siloxane, or a sulfonate siloxane, and an alkali metal molybdate, tungstate or selenate. Subsequently the composition is rendered basic by the addition of sodium or potassium hydroxide. Where protection against the corrosion of copper and copper-containing alloys is also required in addition to aluminum in contact with the aqueous antifreeze concentrates of the invention, an alkali metal azole such as potassium mercaptobenozthiozole or sodium tolyltriazole is then generally added as a 50 percent aqueous solution. Optionally, an antifoam agent is used which can be a low-foaming polyoxyethylene adduct of a polyoxypropylene hydrophobic base having a molecular weight of about 1750 wherein the oxycthylene content is about 10 weight percent of the molecule. Additional low-foaming nonionic surface active agents can be used which are disclosed in U.S. Pat. Nos. 3,340,309; 3,504,041; 3,770,701; and 2.425,755. The disclosures of low-foaming nonionic surface active agents in the above-mentioned U.S. patents are incorporated herein by reference. The resultant antifreeze concentrate composition can be diluted with water in accordance with prior a practice to produce an antifreeze fluid or heat transfer medium having be desired freezing point. As a general rule, the antifreeze concentrate used to prepare the coolant can be diluted with about 1 to about 3 volume of water to arrive at the coolant fluid which is circulated in the engine cooling system or in a cooling tower. Smaller or larger quantities of water can be added as necessary to void the freezing of the coolant.

In order to obtain the desired resistance to cavitation erosion corrosion of aluminum water pumps in contact with aqueous liquids containing a siloxane-silicate co-polymer metal corrosion inhibitor, it is necessary to provide the required amounts of a molybdate, a tungstate, or a selenate in the amounts specified above.

The following formula is an monobasic aliphatic carboxylic acid based coolant utilizing nitrite to prevent cylinder liner cavitation.

TABLE 1

Composition A, A1, and A2 (Coolant Formulas)

| FORMULATION COMPONENTS (wt %) | Composition A | Composition A1 | Composition A2 |
|---|---|---|---|
| Ethylene Glycol | Balance | BBalance | Balance |
| Water Soluble Nitrates | 0.35 | 0.35 | 0 |
| Water Soluble Nitrites | 0.40 | 0.40 | 0 |
| pH | 8.5–9.0 | 8.5–9.0 | 8.5–9.0 |
| 50% Na MercaptoBenzothiazole and/or 50% Na Tolytriazole (Azoles) and/or Benzotriazole | 0.70 | 0.5 | 0.5 |
| Water Soluble Molybdates | 0.4 | 0.2 | 0.2 |
| Silicate Mixture | 0.35 | 0 | 0 |
| NaOH, 45% (caustic to pH) | 3.00 | 3.0 | 3.0 |
| polyvinyl-pyrolidone, 15% | 0.15 | 0 | 0 |
| 2-ethylhexanoic acid | 3.00 | 3.0 | 3.0 |
| Defoamer | 0.04 | 0.04 | 0.04 |

Since diesel engines have a large cooling system, it is common practice to reinhibite the coolant rather than change it. A reinhibition formula Composition B for use with the above Composition A is set forth in Table 2 as follows:

TABLE 2

Composition B (Reinhibition Formula)

| FORMULATION COMPONENTS (wt %) | Composition B |
|---|---|
| Distilled Water Ethylene Glycol | 86.0 |
| NaNO₂ | 5.0 |
| 50% Na MercaptoBenzothiazole and/or 50% Na Tolytriazole (Azoles) and/or Benzotriazole | 4.0 |
| Silicate Mixture | 4.0 |
| polyvinyl-pyrolidone, 15% | 1.0 |

The reinhibition concentrate, Composition B, would be added at a rate of about 1 part to approximately 50 parts of spent diluted, Composition A coolant.

Although Composition B is formulated for use as a reinhibition formula with Composition A, Composition B can be used with other coolants as well.

TABLE 3

(ASTM D2809 Test Results)

| Coolant | Rating 100 Hours | |
|---|---|---|
| A | 8 | passing |
| A1 | 5 | failing |
| A2 | 8 | passing |

The weight losses in Table 3 are in milligrams per coupon. Weight gains are recorded as a zero weight loss.

In Table 1, the formulation "A" is the preferred embodiment of the invention. It is based on the formulation of A2, both of which pass ASTM D2809 test requirements, which is the standard test method for cavitation corrosion and erosion corrosion characteristics of aluminum pumps with engine coolants. Formulation A1, however, fails to pass the test with a rating of 5 on a 1 to 10 scale with 10 the best and passing at 8 or better. Formulation A1 utilizes the light duty formulation of A2 and adds nitrite and nitrate only. The nitrogen component(s) are necessary for formulation of a proper diesel engine coolant degrade the aluminum cavitation protection. In order to restore balance to the formulation, it is necessary to add silicate, siloxane, or a stabilized silicate and to increase the molybdate concentration as set forth in Composition A. These results are unexpected and surprising in that the addition of the silicate, siloxane, or stabilized silicate is necessary to restore the optimal performance characteristics of the formula.

In the ASTM D 1384 test, the Standard Test Method for Corrosion Test for Engine Coolants in Glassware, all three of the formulations pass suggesting good performance. This is shown in Table 4.

TABLE 4

(ASTM D1384 Test Results, Weight Loss)

| Test Specimen | A | A1 | A2 | Passing | Result |
|---|---|---|---|---|---|
| Copper | 1 | 4 | 2 | 10 | Pass |
| Solder | 0 | 4 | 6 | 30 | Pass |
| Brass | 5 | 5 | 3 | 10 | Pass |
| Steel | 0 | 0 | 0 | 10 | Pass |
| Cast Iron | 0 | 0 | 0 | 10 | Pass |
| Aluminum | 0 | 4 | 0 | 30 | Pass |

The test is a screening type and addresses formulation balance. The results further underscore the surprising and unexpected cavitation behavior found in the ASTM D2809 test.

TABLE 5

| | Formula | | | | | | |
|---|---|---|---|---|---|---|---|
| Component | C | D | E | F | G | H | I |
| NaNO² | 0.4 | 0.4 | 0.4 | — | 0.4 | — | — |
| NaNO³ | — | 0.35 | 0.35 | — | — | 0.35 | — |
| Stabilized Silicate | — | — | 0.35 | 0.35 | 0.35 | 0.35 | — |
| FORMULA A2 | Bal | Bal | Bal | Bal | Bal | Bal | Bal |

As shown in Table 5, test were conducted using the Composition of A2 including selected components C–I yielding formulations with selected properties containing nitrates, nitrates, a stabilized silicate and combinations thereof for selected applications, all of which reduced corrosion as set forth in the following tables 6 and 7. The formulations C–I were tested at an outside laboratory, WINCOM INC., whose address is 11103 Deerfield Road, Blue Ash, Oh. 44524.

The following Table 6 shows results for ASTM D1384 "Standard Test Method for Corrosion Test for Engine Coolants in glassware". The results are given in weight loss, mg/coupon. A negative value indicates a weight loss.

TABLE 6

| | Weight Loss (mg/coupon | | | | |
|---|---|---|---|---|---|
| Formula | Copper | Solder | Brass | Steel | Iron | Aluminum |
| C | 0 | 2 | −4 | 0 | −1 | −1 |
| D | 0 | 2 | −5 | 0 | 0 | −2 |
| E | −2 | 0 | −4 | −2 | −1 | 0 |
| F | 0 | 1 | −3 | 1 | 1 | 6 |
| G | 2 | 5 | 0 | 1 | 7 | 1 |
| H | 1 | 2 | 1 | 1 | 4 | 3 |
| I | 0 | 4 | 1 | 1 | 3 | 4 |

Passing requires a weight loss no greater than 10 mg/coupon on all metals except solder and aluminum, where 30 milligrams (mgs) is the limit. All of the formulations C–I pass.

The formulations C–I were also evaluated by ASTM D 4340, "Standard Test Method for Corrosion of Cast Aluminum Alloys in Engine Coolants Under Heat Rejecting Conditions". Results are given in corrosion rate in Table 7. A negative result indicates a weight gain.

TABLE 7

| Formula | Corrosion Rate (mg/cm$^2$/week) |
|---|---|
| C | −0.53 |
| D | 0.25 |
| E | −0.48 |
| F | −0.59 |
| G | −0.61 |
| G | −0.53 |
| I | −0.33 |

As exhibited in Table 7, all of the results are less than 1, or passing. Moreover, all except B have a weight gain indicating that all of the formulas combining selected constituents of nitrates, nitrates, stabilized silicate, and combinations thereof can be utilized with the Composition set forth in A2 to provide a corrosion resistant antifreeze formula incorporating an effective amount of a water soluble liquid alcohol freezing point depressant, a monobasic carboxylic acid or salt thereof, a nitrate salt, nitrate salt and/or stabilized silicate, an azole compound having at least three nitrogen molecules; a molybdate compound; and a polyvinylpyrrolidone.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplifications presented hereinabove. Rather, what is intended to be covered is within the spirit and scope of the appended claims.

We claim:

1. An acid based antifreeze composition consisting essentially of:
   a. a major amount of a water soluble liquid alcohol freezing point depressant;
   b. from about 0.8 to about 10.0 weight percent of a monobasic carboxylic acid compound or the alkali metal salt thereof;
   c. a salt which is at least one selected from the group consisting of sodium nitrate, potassium nitrate, magnesium nitrate, calcium nitrate, lithium nitrate, sodium nitrite, potassium nitrite, magnesium nitrite, calcium nitrite, lithium nitrite and combinations thereof in an amount of from 0.001 to about 10.0 percent by weight;
   d. from about 0.01 to about 10.0 weight percent of an azole compound having at least three nitrogen molecules selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof;
   e. from about 0.001 to about 5.0 weight percent of a molybdate compound;
   f. a silicone-silicate copolymer in an amount of about 0.01 to about 10.0 percent by weight; and
   g. from about 0.001 to about 5.0 percent by weight by weight of a polyvinylpyrrolidone.

2. The acid based antifreeze composition of claim 1, wherein said acid based antifreeze composition is an aliphatic monobasic carboxylic acid compound comprising any $C_3$–$C_{16}$ aliphatic monobasic acid or the alkali metal salt thereof.

3. The acid based antifreeze composition of claim 1 wherein said acid is selected from the acid group consisting of hexanoic, heptanoic, isoheptanoic, octanoic, 2-ethylhexanoic, nonanoic, decanoic, undecanoic, dodecanoic, neodecanoic, and/or combinations thereof.

4. The acid based antifreeze composition of claim 1, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

5. The acid based antifreeze composition of claim 1, wherein said molybdate compound is selected from the group consisting of sodium molybdate, potassium molybdate, lithium molybdate, ammonium molybdates, ammonium dimolybdate, ammonium heptamolybdate, sodium molybdate dihydrate, molybdenum trioxine, heteropolymolybdates, disodium salt dihydrate of molybdic acid, sodium molybdate 2H$_2$O, molybdenum trioxide, silicoheteropolymolybdates, and phosphoroheteropolymolybdates.

6. The acid based antifreeze composition of claim 1, wherein said azole compound is present in an amount of from between about 0.01 to about 1.0 weight percent.

7. The acid based antifreeze composition of claim 1, wherein said molybdate compound is present in an amount of from between about 0.01 to about 1.0 weight percent.

8. The acid based antifreeze composition of claim 1, wherein an alkali metal hydroxide or ammonium hydroxide is used to form the monobasic salt from the acid groups consisting of hexanoic, heptanoic, isoheptanoic, octanoic, 2-ethylhexanoic, nonanoic, decanoic, undecanoic, dodecanoic, neodecanoic, and/or combinations thereof.

9. The acid based antifreeze composition of claim 1 including a defoamer.

10. The acid based antifreeze composition of claim 1 including a dye.

11. The acid based antifreeze composition of claim 1 including a buffering agent.

12. The acid based antifreeze composition of claim 1 including a biocide agent.

13. An antifreeze/coolant solution for inhibiting the corrosion of metals and inhibiting mineral scale based on 100 parts by weight of said glycol-based solution, consisting essentially of:

an aliphatic monobasic carboxylic acid from about 0.8 to about 10.0 weight percent;

a nitrite salt which is at least one selected from the group consisting of sodium nitrite, potassium nitrite, magnesium nitrite, calcium nitrite, lithium nitrite and combinations thereof in an amount of from 0.001 to about 10.0 percent by weight;

a nitrate salt selected from the group consisting of sodium nitrate, potassium nitrate, magnesium nitrate, calcium nitrate, lithium nitrate, and combinations thereof in an amount of from 0.001 to about 10.0 percent by weight;

an azole compound selected from the group consisting of sodium mercaptobenzothiazole, sodium tolytriazole, water-soluble triazoles, benzotriazole, tolyltriazole, sodium 2-mercaptobenzothiazole and combinations thereof in an amount of about 0.01 to about 10.0 percent by weight;

a silicone-silicate copolymer in an amount of about 0.01 to about 10.0 percent by weight;

from about 0.001 to about 5.0 percent by weight of a polyvinylpyrrolidone;

from about 0.001 to about 10.0 weight percent of a transition metal compound selected from the group consisting of disodium salt dihydrate of molybdic acid, molybdenum trioxide, silicoheteropolymolybdates and/or phosphoroheteropolymolybdates, sodium molybdate, potassium molybdate, lithium molybdate, ammonium molybdate, ammonium dimolybdate, and ammonium heptamolybdate; and a glycol compound selected from the group consisting of ethylene glycol, diethylene glycol, propylene glycol, methyl alcohol, ethyl alcohol, propyl alcohol, isopropyl alcohol and combinations thereof making up the balance of the solution.

14. The acid based antifreeze composition of claim 13 further comprising antifreeze/coolant reinhibition concentrate packaged as an additive added at a rate of one (1) part to approximately fifty (50) parts of spent diluted, coolant, consisting essentially of:

a salt which is at least one selected from the group consisting of sodium nitrite, potassium nitrite, magnesium nitrite, calcium nitrite, lithium nitrite and combinations thereof in an amount of about 0.001 to about 10.0 percent by weight;

an azole compound selected from the group consisting of sodium mercaptobenzothiazole, sodium tolytriazole, water-soluble triazoles, benzotriazole, tolyltriazole, sodium 2-mercaptobenzothiazole, and combinations thereof in an amount of about 0.01 to about 10.0 percent by weight;

a silicone-silicate copolymer in an amount of about 0.01 to about 10.0 percent by weight;

from about 0.001 to about 5.0 percent by weight of a polyvinylpyrrolidone; and a glycol compound selected from the group consisting of ethylene glycol, diethylene glycol, propylene glycol, methyl alcohol, ethyl alcohol, propyl alcohol, isopropyl alcohol and combinations thereof from about 80 to about 90 percent by weight.

15. An effective amount of a corrosion inhibiting acid based antifreeze composition consisting essentially of:

a. a major amount of a water soluble liquid alcohol freezing point depressant;

b. a monobasic carboxylic acid compound or the alkali metal salt thereof;

c. a salt comprising sodium nitrate, potassium nitrate, magnesium nitrate, calcium nitrate, lithium nitrate, sodium nitrite, potassium nitrite, magnesium nitrite, calcium nitrite, lithium nitrite and combinations thereof;

d. an azole compound having at least three nitrogen molecules;

e. a molybdate compound;

f. a silicone-silicate copolymer; and g. a polyvinylpyrrolidone.

16. The acid based antifreeze composition of claim 15, wherein said monobasic carboxylic acid is present in an effective amount of from about 0.8 to about 10.0 weight percent.

17. The acid based antifreeze composition of claim 15, wherein said salt is present in an effective amount of from 0.001 to about 10.0 percent by weight.

18. The acid based antifreeze composition of claim 15, wherein said azole compound is present in an effective amount of from about 0.01 to about 10.0 weight percent.

19. The acid based antifreeze composition of claim 15, wherein said stabilized silicone-silicate is present in an effective amount of about 0.01 to about 10.0 percent by weight.

20. The acid based antifreeze composition of claim 15, wherein said polyvinylpyrrolidone is present in an effective amount of from about 0.001 to about 5.0 percent.

21. The acid based antifreeze composition of claim 15, wherein said transition metal molybdate compound is present in an effective amount of from about 0.001 to about 10.0 weight percent.

22. A process for inhibiting corrosion of metal in the presence of aqueous liquids consisting essentially of adding to said aqueous liquid the following amounts based on percent by weight:

a. a major amount of a water soluble liquid alcohol freezing point depressant selected from the group consisting of ethylene glycol, diethylene glycol, propylene glycol, methyl alcohol, ethyl alcohol, propyl alcohol, isopropyl alcohol and combinations thereof;

b. from 0.8 to 10.0 weight percent of a monobasic carboxylic acid compound or the alkali metal salt thereof;

c. from 0.01 to about 10.0 weight percent of an azole compound selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof;

d. from 0.001 to about 5.0 weight percent of a molybdate compound;

e. a nitrite salt which is at least one selected from the group consisting of sodium nitrite, potassium nitrite, magnesium nitrite, calcium nitrite, dithium nitrite and combinations thereof in an amount of from 0.001 to about 10.0 percent by weight;

f. a nitrate salt which is at least one selected from the group consisting of sodium nitrate, potassium nitrate, magnesium nitrate, calcium nitrate, lithium nitrate, and combinations thereof in an amount of from 0.001 to about 10.0 percent by weight;

g. a silicone-silicate copolymer in an amount of about 0.01 to about 10.0 percent by weight;

h. from about 0.001 to about 5.0 percent by weight of a polyvinylpyrrolidone.

23. A process for inhibiting corrosion of metal in the presence of aqueous liquids consisting essentially of adding to said aqueous liquid the following amounts based on percent by weight:
   a. a major amount of a water soluble liquid alcohol freezing point depressant selected from the group consisting of ethylene glycol, diethylene glycol, propylene glycol, methyl alcohol, ethyl alcohol, propyl alcohol, isopropyl alcohol and combinations thereof;
   b. from 0.8 to 10.0 weight percent of a monobasic carboxylic acid compound or the alkali metal salt thereof;
   c. from 0.01 to about 10.0 weight percent of an azole compound selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof;
   d. from 0.01 to about 5.0 weight percent of a molybdate compound;
   e. a salt which is at least one selected from the group consisting of sodium nitrate, potassium nitrate, magnesium nitrate, calcium nitrate, lithium nitrate, sodium nitrite, potassium nitrite, magnesium nitrite, calcium nitrite, lithium nitrite, sodium nitrate, potassium nitrate, magnesium nitrate, calcium nitrate, lithium nitrate, and combinations thereof in an amount of from 0.001 to about 10.0 percent by weight;
   f. a silicone-silicate copolymer in an amount of about 0.01 to about 10.0 percent by weight; and
   g. from about 0.001 to about 5.0 percent by weight of a polyvinylpyrrolidone.

24. An effective amount of a corrosion inhibiting acid based antifreeze composition consisting essentially of:
   a. a major amount of a water soluble liquid alcohol freezing point depressant;
   b. a monobasic carboxylic acid compound or the alkali metal salt thereof;
   c. an azole compound having at least three nitrogen molecules;
   d. an effective amount of a molybdate compound;
   e. a nitrite salt selected from the group consisting of sodium nitrite, potassium nitrite, magnesium nitrite, calcium nitrite, lithium nitrite and combinations thereof;
   f. a nitrate salt comprising sodium nitrate, potassium nitrate, magnesium nitrate, calcium nitrate, lithium nitrate, and combinations thereof;
   g. a silicone-silicate copolymer; and
   h. a polyvinylpyrrolidone.

25. The antifreeze composition of claim 24 wherein said monobasic carboxylic acid compound or the alkali metal salt thereof is present in an amount of from about 0.8 to about 8.0 weight percent.

26. The antifreeze composition of claim 24, wherein said monobasic carboxylic acid compound or the alkali metal salt thereof is present in an amount of from about 1.0 to about 5.0 weight percent.

27. The antifreeze composition of claim 24, wherein said azole compound having at least three nitrogen molecules is present in an effective amount of from between 0.001 to about 5.0 weight percent.

28. The antifreeze composition of claim 24, wherein said molybdate containing transition compound is present in an effective amount of from between 0.01 to about 5.0 weight percent.

29. The acid based antifreeze composition of claim 24 wherein said acid is selected from the acid group consisting of hexanoic, heptanoic, isoheptanoic, octanoic, 2-ethylhexanoic, nonanoic, decanoic, undecanoic, dodecanoic, neodecanoic, and/or combinations thereof.

30. The acid based antifreeze composition of claim 24, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

31. The acid based antifreeze composition of claim 24, wherein said molybdate compound is selected from the group consisting of sodium molybdate, potassium molybdate, lithium molybdate, ammonium molybdates, ammonium dimolybdate, ammonium heptamolybdate, sodium molybdate dihydrate, molybdenum trioxine, heteropolymolybdates, disodium salt dihydrate of molybdic acid, sodium molybdate $2H_2O$, molybdenum trioxide, silicoheteropolymolybdates, and phosphoroheteropolymolybdates.

32. The acid based antifreeze composition of claim 24, wherein said azole compound having at least three nitrogen molecules is selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole, and combinations thereof.

33. The acid based antifreeze composition of claim 24, wherein said nitrite salt is present in an amount of from 0.001 to about 10.0 percent by weight.

34. The acid based antifreeze composition of claim 24, wherein said nitrate salt is present in an amount of from 0.001 to about 10.0 percent by weight.

35. The acid based antifreeze composition of claim 24, wherein said a silicone-silicate copolymer in an amount of about 0.01 to about 10.0 percent by weight.

36. The acid based antifreeze composition of claim 24, wherein said polyvinylpyrrolidone is present in amount of from between about 0.001 to about 5.0 percent by weight.

37. The acid based antifreeze composition of claim 13 further comprising antifreeze/coolant reinhibition concentrate packaged as an additive added at a rate of one (1) part to approximately fifty (50) parts of spent diluted, coolant, consisting essentially of:
   a. a major amount of a water soluble liquid alcohol freezing point depressant in an amount of from about 80 to about 90 percent by weight;
   b. a salt selected from the group consisting of sodium nitrite, potassium nitrite, magnesium nitrite, calcium nitrite, lithium nitrite, sodium nitrate, potassium nitrate, magnesium nitrate, calcium nitrate, lithium nitrate, and combinations thereof in an amount of about 0.001 to about 10.0 percent by weight;
   c. an azole compound comprising at least three nitrogen molecules in an amount of about 0.01 to about 10.0 percent by weight;
   d. a water soluble silicate comprising a silicone-silicate copolymer in an amount of from 0.01 to 10.0 percent by weight; and
   e. a polyvinylpyrrolidone in an among of from about 0.001 to about 5.0 percent by weight f. a molybdenum compound.

38. The reinhibition concentrate of claim 37, wherein said molybdenum compound is present in an amount of from 0.01 to about 5.0 percent by weight.

39. The reinhibition concentrate of claim 37, wherein said major amount of a water soluble liquid alcohol freezing point depressant is selected from the group consisting of ethylene glycol, diethylene glycol, propylene glycol, dipropylene glycol, methyl alcohol, ethyl alcohol, propyl alcohol, and isopropyl alcohol, and combinations thereof.

40. The reinhibition concentrate of claim 37, wherein said azole compound is selected from the group consisting of tolytriazole, hydrocarbyl triazole, benzotriazole, mercaptobenzothizole, pyrazoles, isooxazoles, isothiazoles, thiazoles, thiadiazole salts, 1,2,3-benzotriazole, 1,2,3-tolyltriazole, sodium 2-mercaptobenzothiazole a three ring nitrogen containing azole, and combinations thereof.

41. The reinhibition concentrate of claim 37, wherein said azole compound is present in an amount of from between about 0.01 to about 5.0 weight percent.

42. The reinhibition concentrate of claim 37, wherein said water soluble silicate is a silicone-silicate copolymer present in an amount of about 0.01 to about 5.0 percent by weight.

43. The reinhibition concentrate of claim 37, wherein said polyvinylpyrrolidone is present in an amount of from about 0.001 to about 3.0 percent by weight.

* * * * *